No. 842,147. PATENTED JAN. 22, 1907.
D. J. HAVENSTRITE.
ICE MAKING APPARATUS.
APPLICATION FILED MAY 25, 1905.
4 SHEETS—SHEET 1.
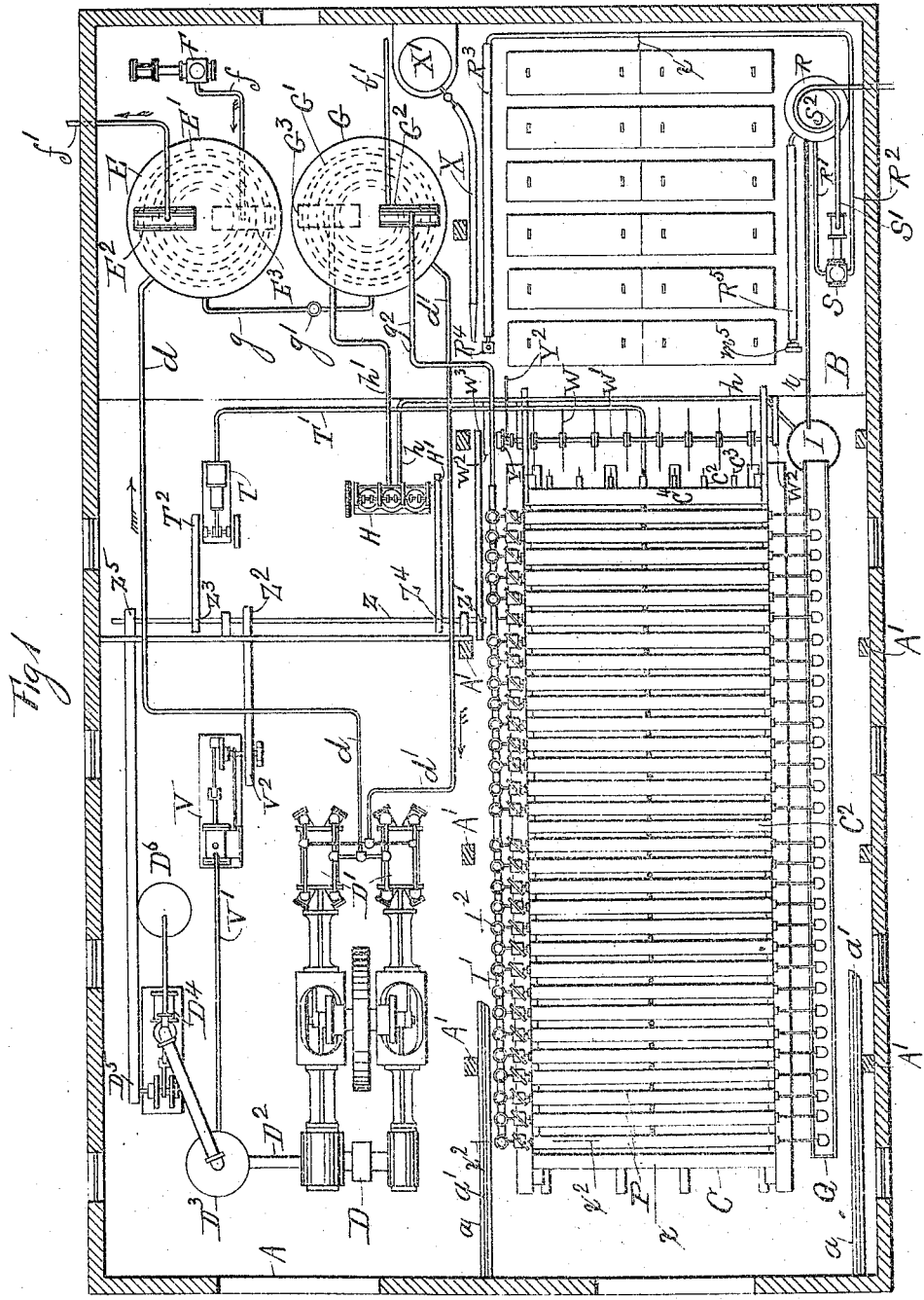
Witnesses
William H. Bowie
O. Otto
Inventor
David J. Havenstrite
By his Attorney
A. A. de Bonneville

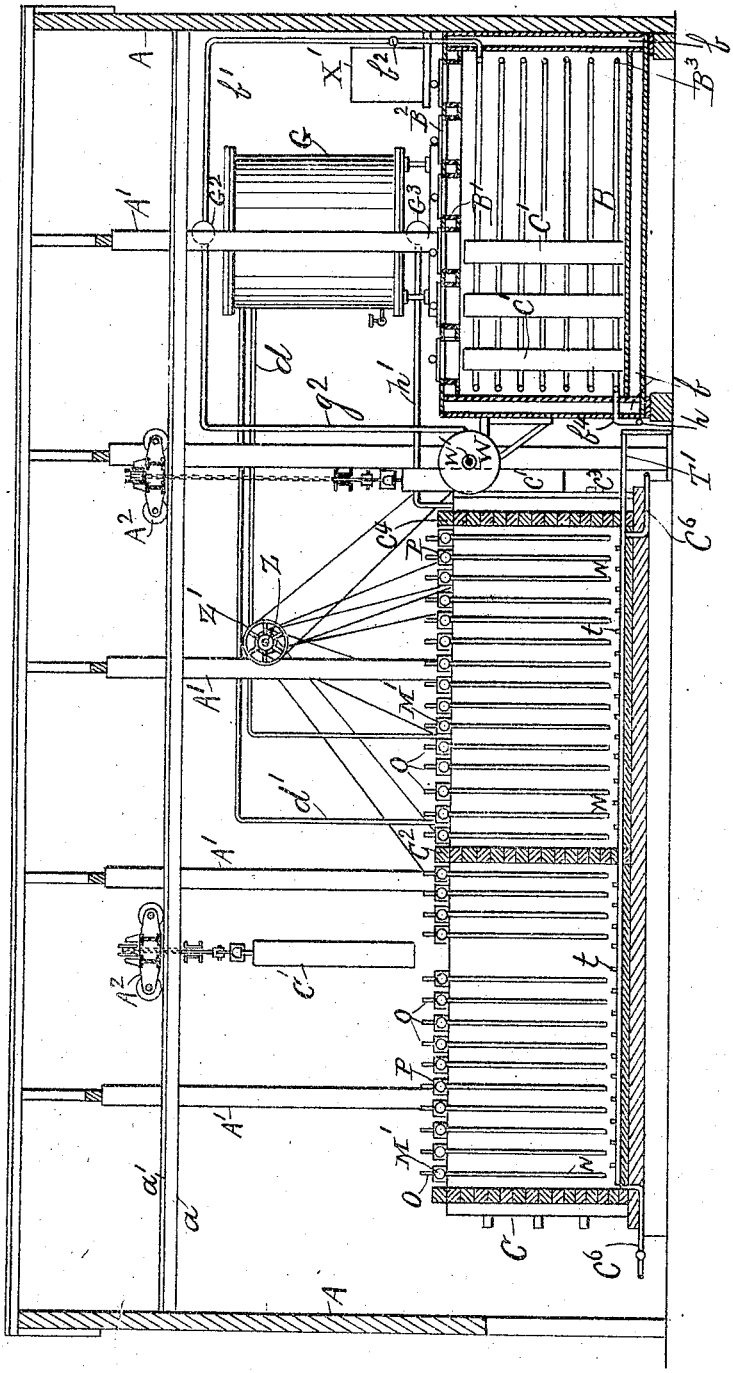

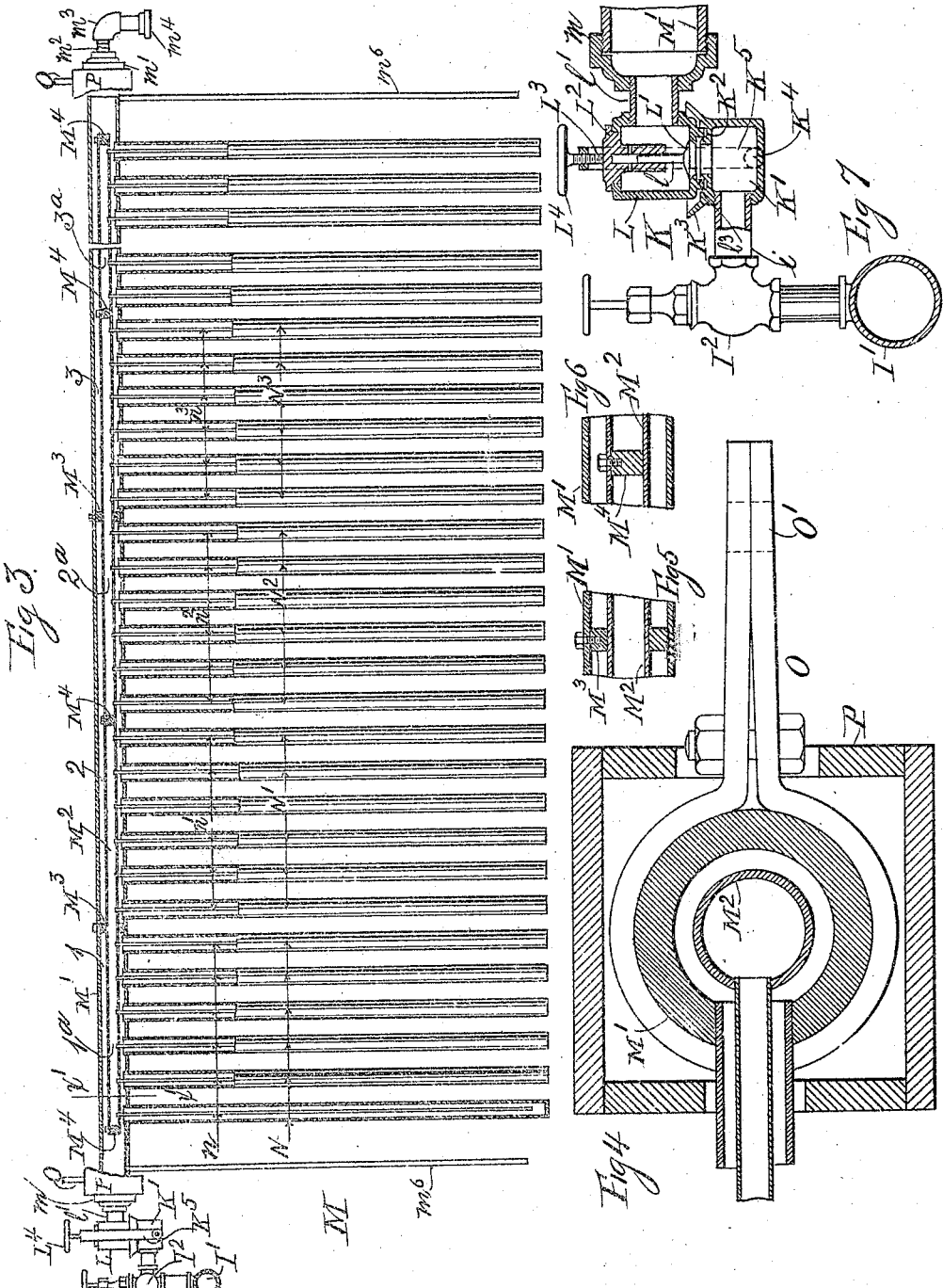

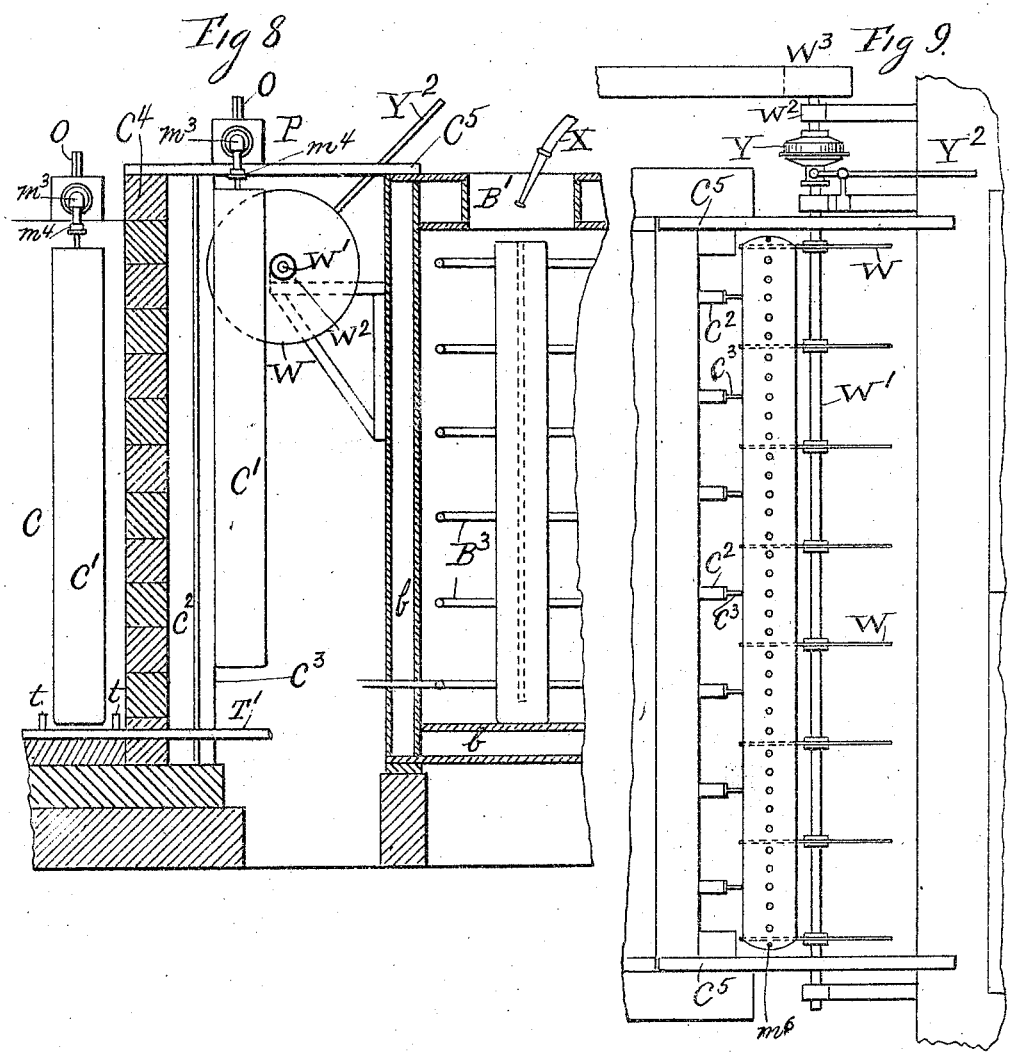
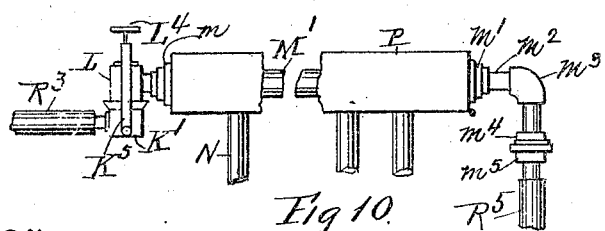

UNITED STATES PATENT OFFICE.

DAVID J. HAVENSTRITE, OF NEWARK, NEW JERSEY.

ICE-MAKING APPARATUS.

No. 842,147.

Specification of Letters Patent.

Patented Jan. 22, 1907.

Application filed May 25, 1905. Serial No. 262,210.

*To all whom it may concern:*

Be it known that I, DAVID J. HAVENSTRITE, a citizen of the United States, and a resident of Newark, in the county of Essex and State of New Jersey, have invented certain new and useful Improvements in Ice-Making Apparatus, of which the following is a specification.

This invention relates to improved means for making plate-ice.

Among its specific points of novelty is the production of plate-ice without the casing or cells that are generally used with the plate-ice plants.

With the freezing-plates heretofore used the refrigerant has to produce its effect through the whole cake of ice from one side thereof to the other, requiring the conduction of the cold-producing agent through the total thickness. With my invention the ice is formed radially in all directions, reducing the thickness through which the cold-producing agent has to act or be conducted, saving thereby energy and time. With plate plants heretofore used the freezing-surfaces have been unremovable parts of the freezing-tank; but with my invention the freezing-plates can be removed from the tank.

The invention is exemplified in the accompanying drawings, in which—

Figure 1 shows a sectional plan view of a building with a plate-ice plant. Fig. 2 represents a section of Fig. 1 on the line $x\ x$. Fig. 3 is a partial axial section and elevation of one section of the freezing-coils with their appurtenances. Fig. 4 represents a section of Fig. 3 as on the line $x'\ x'$. Figs. 5 and 6 show enlarged fragmentary portions of Fig. 3. Fig. 7 shows an enlarged partial section through one of the freezing-coils as on the line $x^2\ x^2$ of Fig. 1. Fig. 8 represents an enlarged fragmentary portion of Fig. 2. Fig. 9 is a top view of Fig. 8. Fig. 10 represents a fragmentary side view of one of the freezing-plates with hose connections attached thereto.

A building is shown at A with posts A', to which are secured runway-beams $a$ for the track-rails $a'$ of cranes A². Cakes of ice C' are shown supported from the said cranes.

A freezing-tank C, with a bulkhead C² dividing it into sections, is situated under the said cranes, so that freezing-plates, with the lifting-clamps O, can be handled by the cranes. An ice-house B is also under the runways of the crane. Its walls are insulated, as shown at $b$, and have openings B', with covers B² and cooling-coils B³. A number of cakes of ice C' are shown therein.

A compressor-engine D with a compound steam end discharges the compressed freezing medium, like ammonia, through the discharge-piping $d$ into the shell of the condenser E, the latter containing the cooling-coil E', which is connected at the top to the header E² and on the bottom to the header E³. A water-circulating pump F forces water through the piping $f$ into the header E³, and the piping $f'$, connected to the header E², drains the latter and the coil E'.

A brine-cooling tank G is connected with the condenser E by means of the piping $g$, having the expansion-valve $g'$. Piping $d'$ extends from the brine-cooling tank G to the compressor-end D' of the compressor-engine D. On the inside of the said tank G is located the brine-cooling coil G; with the top header G² and bottom header G³. A brine-circulating pump H has its suction-piping $h$ extending from a brine-storage tank I, and its discharge-piping $h'$ is connected with the bottom header G³ of the said tank G. The top header G² has leading therefrom the piping $b'$, with valve $b^2$, that connects with the cooling-coils B³, and the latter are connected to the suction-piping $h$ of the pump H by means of the piping $b^4$. The top header G² is connected to the piping $g^2$, which leads to the main brine-header I', that has connected therewith the valves I². The latter have the nipples $i$, that join with the couplings, (designated by the letter K.) The said couplings each comprise the cup-chamber K', with the seat K², cupped flange K³, and pins K⁴ for the U-shaped strap K⁵. Arranged to seat with the said cup-chamber is the valve-chamber L, having the projecting collar $l^3$, with the valve L' and cap L² drilled for the spindle $l$ of the valve L'. A threaded spindle L³, with handle L⁴, operates through a threaded opening in the said strap K⁵, by virtue of which the valve-chamber L can be easily clamped to and disconnected from the cup-chamber K'. From the said valve-chamber L there extends the nipple $l'$, which connects with the coupling $m$ of the pipe M' of the freezing-plates, (designated by the letter M.) The said plates each comprise the outer horizontal pipe M', with the rods $m^6$ secured near their ends. In the pipe M' is located the inner horizontal pipe M². Collars M³ hold the latter pipe in proper position and also divide the large pipe M' in sections, as 1 2 3, &c. The inner pipe M² has attached thereto the plugs $M^4$, dividing the latter pipe into sections $1^a$ $2^a$ $3^a$, &c. From the outer horizontal pipe $M'$ extend the vertical pipes $N$ $N'$ $N^2$ $N^3$, &c., that are closed on the bottom, and from the inner horizontal pipe $M^2$ extend the inner vertical pipes $n$ $n'$ $n^2$ $n^3$, &c., which latter are open at both ends. At the ends of each outer pipe M are secured lifting-clamps O, having each an opening $O'$, and a casing P covers each of the said pipes $M'$ to hold an insulating material and prevent as much as possible the reduction of the temperature of the medium contained in the freezing-plates. At the other end of each of the pipes $M'$ there is connected a reducing-coupling $m'$, from which latter extends a nipple $m^2$, with elbow $m^3$ and one member $m^4$ of a coupling. It is evident that the inlet and outlet of the freezing-plate could be arranged with the inner pipe $M^2$ instead of the outer pipe $M'$, or the inlet could be arranged with the outer pipe and the outlet with the inner pipe, or vice versa. A trough Q is located under the ends of the coupling members $m^4$ and leads to the brine-storage tank I.

A thawing apparatus is represented to consist of the brine-tank R, from which leads the piping $R'$ to the suction end of the pump S, and discharge-piping $R^2$ of said pump connects with the hose $R^3$, having a coupling member $R^4$ similar in construction to the cup-chamber $K'$ of the main brine-header. A hose $R^5$ with a coupling member $m^5$ extends from the tank R. The exhaust-piping $S'$ of the pump S connects with a coil $S^2$ in the tank R.

An air-compressor T has its discharge-pipe $T'$ extended into the freezing-tank C, and at the bottom thereof nipples $t$ extend from the pipe $T'$ into the said freezing-tank. The steam end of the compressor-engine D has its exhaust-pipe $D^2$ connected with a heater $D^3$, from which latter the exhaust-steam is drawn to a condensing apparatus $D^4$. An engine V has its exhaust-pipe $V'$ also connected with the heater $D^3$.

Between the freezing-tank C and ice-house B there are mounted the saws W on the shaft $W'$, supported in bearings $W^2$. A friction-clutch Y with the handle $Y^2$ is connected up with the shaft $W'$. A pulley $W^3$ on the shaft $W'$ is belted to the pulley $Z'$ on the main shaft Z. The latter shaft is driven by the engine V by means of belting connecting the pulley $V^2$ on the engine-shaft with the pulley $Z^2$ on the shaft Z. The air-compressor T is driven from the shaft Z by means of belting connecting the pulley $T^2$ of the compressor T with the pulley $Z^3$ on the main shaft Z. The brine-circulating pump H is driven by belting connecting the pulley $Z^4$ on the main shaft with the pulley $H'$ on the said pump. The condensing apparatus has the pulley $D^5$ connected by belting with the pulley $Z^5$ of the said main shaft Z. Extending from the bulkhead $C^4$ on the freezing-tank C are secured the wooden vertical rail-supports $C^2$, faced with the iron rails $C^3$, and ice-guiding bars $C^5$ extend from the bulkhead $C^4$ to the ice-house B.

To use the invention, the tank C, containing the freezing-plates M, is filled with water. The compressor-engine D is started, exhausting the evaporated refrigerant, like ammonia, from the brine-cooling tank G and discharging it into the condenser E, where it is condensed into a liquid by reason of first having been compressed in the compressor and then condensed to a liquid by means of water circulating through the coil $E'$ with the water-circulating pump F. The refrigerant is then led into the brine-cooling tank G by way of the piping $g$ and through the expansion-valve $g'$, thereby completing the cycle of the refrigerant. Brine is circulated through the coil in the tank G by means of the brine-circulating pump H entering said pump through the piping $h$ and discharging into the coil $G'$ by way of the piping $h'$, and the said brine is cooled in the said tank by virtue of the expansion of the refrigerant therein, as just described. The cooled brine is led from the tank G through the piping $g^2$ and enters the main brine-header $I'$ to circulate through the freezing-plates, as follows: The brine passes through the valve $I^2$ and coupling K into the outer pipe $M'$ of each freezing-plate M and circulating around and about the inner horizontal pipe $M^2$ in the first section 1 of said freezing-plate. Next the brine passes down the vertical pipes N to the bottom of the same and rises through the inner vertical pipes $n$ and enters the inner horizontal pipe $M^2$ in the first section thereof, $1^a$. The brine next passes down the inner vertical pipes $n'$ in the right-hand end of section $1^a$; then passes up around the outside of the pipes $n'$ in the pipes $N'$, enters the left-hand end of section 2, goes to the right-hand end of section 2, and passes down the vertical pipes $N^2$, after which it rises in the pipes $n^2$ into the left-hand section of $2^a$, &c., until finally it leaves the main horizontal pipe $M'$ by way of the coupling at the end thereof. By virtue of this circulation of the cooled brine in the pipes composing the freezing-plates submerged in the water-tank C ice is evenly formed on the vertical pipes N $N'$, &c. The brine after having performed its work in freezing the water is discharged into the trough Q and drains into the brine-storage tank I, from which it is drawn by the suction-piping $h$ of the brine-pump H, as already mentioned.

When ice has been frozen to the required thickness on the plates M, they are disconnected from the main brine-header $I'$ by first closing the valves $I^2$ and then disconnecting the members of the coupling K by unscrewing the spindle $L^4$ and pulling the same to an inclined or horizontal position with the U-shaped strap K⁵, when the valve-chamber L can be separated from the chamber K'. A small portion of brine remains at all times in the cup K³, which prevents the freezing together of the members of the coupling K. Next the elbow m³ at the other end of the horizontal pipe M' is turned up to prevent the brine contained in the freezing-plate from being spilled out of the same. Each freezing-plate, with its ice frozen thereto, is raised out of the tank C by means of the cranes A² and carried over the ice-saws W and cut into sections by being lowered against the rails C³ to allow the saws to cut the ice from the bottom to the top thereof. The freezing-plates, with the ice still adhering thereto, are again raised by the crane A² and brought over the openings B' in the ice-house B and lowered into the same, the said ice-house being maintained at a low freezing temperature by means of cooling-coils B³. The next operation is to thaw the vertical pipes N N' N², &c., of the freezing-plates M from the cakes of ice, and which is accomplished by coupling the hose R³ of the thawing apparatus with the end of the pipe M' having the valve-chamber L and connecting the hose R⁵ with the end of the pipe having member of the coupling m⁴. The pump is started and brine is drawn from the brine-thawing-off tank R and circulated through a freezing-plate, the brine returning to the said tank R. By reason of the brine in the tank R having been warmed the pipes of the freezing-plate are loosened from the ice surrounding them, and the said plate is next lifted out of the ice-house by means of one of the cranes A² and taken back to be coupled in position in the tank C, where it is again put into commission. The brine in the tank R is kept warm by means of the exhaust of the pump S, passing through the coil S² in said tank. The overflow of the brine in the tank R is led into the tank I by means of the piping r. The cakes of ice as the pipes of the freezing-plates are separated from the same leave small vertical holes therein, which are now filled with distilled water by means of the hose X, supplied from the distilled-water storage-tank X', and the low temperature of the cakes of ice and low temperature in the ice-house very quickly freezes the said water and produces solid cakes of ice. To produce clear ice on the freezing-plates, air is forced through the piping T' from the air-compressor T and enters the tank C under the freezing-plates at the nozzles t in the piping T'. The tank C can be cleaned and drained through the outlets C⁶.

In the drawings the steam-exhaust from the compressor-engine enters the heater D³ through the pipe D². The exhaust from the engine V for driving the auxiliary machinery also enters the said heater and from which it is directed to the condensing apparatus D⁴ and then is discharged into the hot-well D⁶. The main shaft Z is driven by the engine V, and it in turn drives the air-compressor, brine-circulating pump, and saws, as shown. The saw-shaft W' can be started and stopped by using the clutch Y, with handle Y² connected up therewith. The solid rods m⁶, extending from horizontal pipes M' and which are frozen into the ice, are not thawed loose, and the ice immediately adjacent thereto is returned to the tank C. The object of this is to be able to square the ends of the ice cakes when sawed, and the portions of ice returned to the tank will assist in cooling and freezing the next cake to be frozen.

Having described my invention, I claim—

1. An apparatus for making plate-ice comprising a tank, a plurality of separated and independent freezing-plates each of which plates consists of a series of separated simple depending pipes, and adapted to be supported free from the side and end walls and bottom of the tank, means for circulating a freezing medium through the pipes of said plates whereby may be formed on each freezing-plate a separate and distinct plate of ice surrounding the sides, ends and bottom of the freezing-plate and attached thereto and free from the tank, and means for independently raising the separated and independent freezing-plate with ice-plate attached thereto.

2. An apparatus for making plate-ice comprising a tank, a plurality of separated and independent freezing-plates, each of which plates consists of a series of separated simple vertical depending pipes, and adapted to be supported free from the side and end walls and bottom of the tank, and means for circulating a freezing medium through the pipes of said plates whereby may be formed on each freezing-plate a separate and distinct plate of ice surrounding the sides, ends and bottom of the said pipes and attached thereto and free from the tank.

3. An apparatus for making plate-ice comprising a tank, a plurality of separated and independent freezing-plates, each of which plates consists of a series of separated simple depending pipes, and adapted to be removably supported in said tank and having the ends, sides and bottom of the freezing-plate free from the sides, ends and bottom of the tank, means for independently circulating and cutting off a freezing medium through each of the said freezing-plates whereby an independent plate of ice may be formed on each of the freezing-plates separated from the tank and each other, and means adapted to be independently connected to each of the freezing-plates for supplying a thawing medium thereto for separately detaching the same from the plates of ice.

4. An apparatus for making plate-ice comprising a tank, a freezing-plate consisting of a series of separated simple depending pipes and adapted to be removably supported in said tank and having the ends, sides and bottom of the freezing-plate entirely free from the sides, ends and bottom of the tank, means for circulating a freezing medium through the pipes of said plate, thereby freezing a plate of ice entirely around the sides, ends and bottom of said freezing-plate and attached thereto and free from the tank, means for removing said freezing-plate and attached plate of ice from the tank, and means adapted to be connected to the freezing-plate for supplying a thawing medium thereto and detaching the same from the attached plate of ice.

5. A plant for making plate-ice comprising a tank, a plurality of separate and independent freezing-plates, each of which plates consists of a series of separated simple depending pipes and adapted to be removably supported in said tank and having the ends, sides and bottom of the freezing-plate entirely free from the sides, ends and bottom of the tank, means for independently circulating and cutting off a freezing medium through each of the said freezing-plates whereby an independent plate of ice may be formed on each of the freezing-plates and separated from the tank and each other, means for independently removing each of the freezing-plates with its attached plate of ice from the tank, and means adapted to be independently connected to each of the freezing-plates for supplying a thawing medium thereto and separately detaching the same from the plates of ice.

6. In a freezing-plate the combination of a main pipe, a second pipe within the same, collars between the said pipes, fitting the inner surface of the main pipe and the outer surface of the second pipe, dividing the main pipe in sections, plugs at the ends and at different points of the inner pipe dividing the latter into sections, pipes with their outer ends closed extending from the different sections of the main pipe, pipes open at both ends extending from the different sections of the second pipe, and leading into the pipes extending from the sections of the main pipe, and means to couple the ends of the freezing-plate with other appurtenances.

Signed at New York, in the county of New York and State of New York, this 22d day of May, A. D. 1905.

DAVID J. HAVENSTRITE.

Witnesses:
MYRON H. COOK,
WILLIAM H. BOWIE.